(No Model.)

A. RUEGENBERG.
DEVICE FOR STOPPING RUNAWAY HORSES.

No. 292,589. Patented Jan. 29, 1884.

WITNESSES:
A. P. Grant
W. F. Kircher

INVENTOR:
Aloys Ruegenberg,
BY John A. Wiedersheim
ATTORNEY.

UNITED STATES PATENT OFFICE.

ALOYS RUEGENBERG, OF PHILADELPHIA, PENNSYLVANIA.

DEVICE FOR STOPPING RUNAWAY HORSES.

SPECIFICATION forming part of Letters Patent No. 292,589, dated January 29, 1884.

Application filed November 30, 1883. (No model.)

*To all whom it may concern:*

Be it known that I, ALOYS RUEGENBERG, a subject of the King of Prussia, residing in the city and county of Philadelphia, State of Pennsylvania, have invented a new and useful Improvement in Devices for Stopping Runaway Horses, which improvement is fully set forth in the following specification and accompanying drawings, in which—

Figure 1:
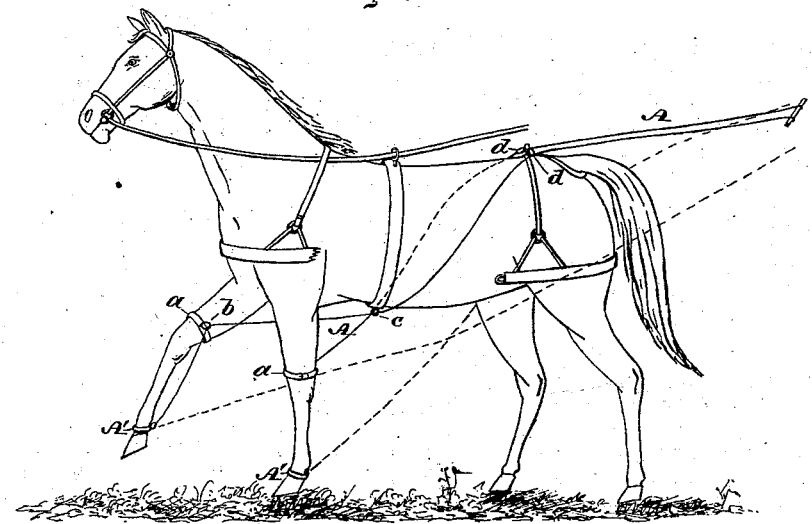
Figure 2:
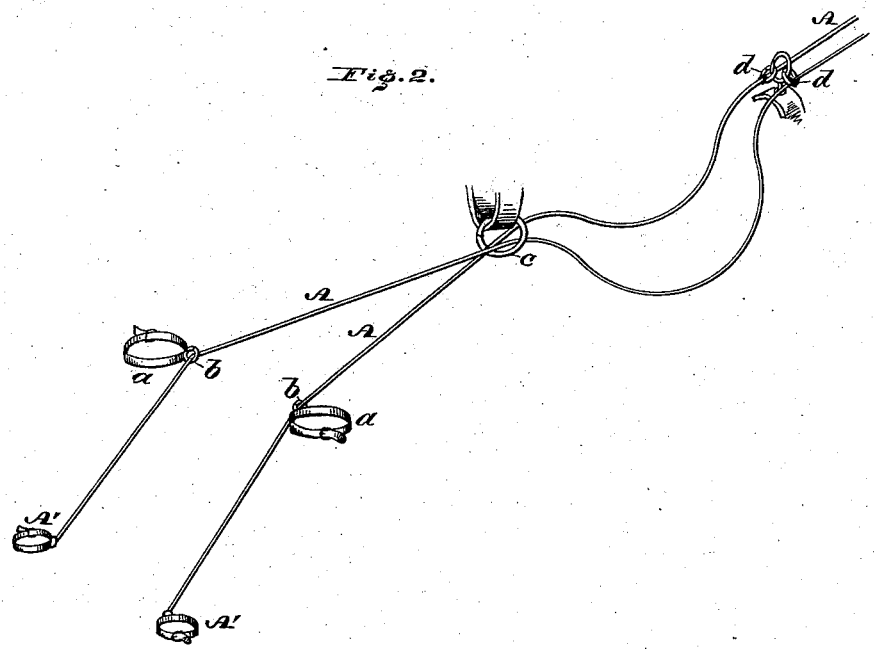

Figure 1 is a perspective view of a device for stopping a runaway horse, showing the same in position on the horse. Fig. 2 is a perspective view thereof enlarged.

Similar letters of reference indicate corresponding parts in the two figures.

My invention consists of a device for stopping a runaway horse or other animal, adapted to be applied to the horse without interfering with his proper motions and becoming serviceable when the horse is fractious or runs away, the construction and operation of the same being hereinafter fully set forth.

Referring to the drawings, A represents a pair of lines independent of the usual driving-reins, the front end of the lines being adapted to be permanently connected by means of straps A' with the front legs of the animal, just above the fetlock thereof, the rear ends reaching to the carriage, wagon, or other vehicle, so as to be conveniently accessible by the driver. On the front legs of the animal, above the knees, are attached straps $a$, which have rings or loops $b$, through which the lines A are passed. To the harness, underneath the body, are attached rings or loops $c$, and on the back thereof, or sides, if desired, are attached rings or loops $d\, d$, the lines A likewise passing through said rings $c\, d$. The rings $b\, c\, d$ are formed of rubber, metal, or other suitable material, split or divided, so that when they are subjected to strain they open or separate, and thus leave their places of attachment with the straps $a$ and harness, the lines, however, remaining connected with the front legs, as at A', as has been described.

It will be seen that when the horse becomes dangerously fractious or runs away, the driver draws the lines A, and as they tighten on the front legs the rings $b\, c\, d$, which primarily hold the lines in position so as not to interfere with the motions of the animal, are forced open, and thus automatically removed from their places of support and attachment, whereby the power of the driver is exerted on the lines directly from the front legs, adjacent to the fetlocks, the tendency of which is to throw the front hoofs rearward and bring the animal on his knees, thus placing him under full control, the harness remaining undisturbed. The rings may again be located, and thus the lines are ready for further requirements.

If desired, the straps $a$ may be of the form of split rings adapted to clasp the legs of the animal, in which case said rings are fastened to the lines. The rings $c\, d$ may also be secured to the lines, so that the draft on the latter is exerted successively on the rings $d\, c\, b$, causing them to leave their position without delay when the lines are brought into service, the action on the animal then being similar to that hereinbefore stated.

Having thus described my invention, what I claim as new, and desire to secure by Letters Patent, is—

An improved device for stopping a runaway horse, consisting of lines A, attachments A', and connections $b\, c\, d$, the latter being automatically detachable by the draft on said lines, and when detached the lines are entirely disconnected from the harness, substantially as described.

ALOYS RUEGENBERG.

Witnesses:
JOHN A. WIEDERSHEIM,
A. P. GRANT.